(12) United States Patent
Toyota (10) Patent No.: US 10,232,635 B2
(45) Date of Patent: Mar. 19, 2019

(54) OPTICAL SCANNING DEVICE AND IMAGE FORMING APPARATUS INCLUDING THE SAME

(71) Applicant: KYOCERA Document Solutions Inc., Osaka (JP)

(72) Inventor: Yuji Toyota, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/687,959

(22) Filed: Aug. 28, 2017

(65) Prior Publication Data

US 2018/0056668 A1 Mar. 1, 2018

(30) Foreign Application Priority Data

Aug. 30, 2016 (JP) ................................. 2016-168598

(51) Int. Cl.
*B41J 2/47* (2006.01)
*G02B 26/10* (2006.01)
*B23K 26/082* (2014.01)
*B41M 5/025* (2006.01)

(52) U.S. Cl.
CPC ............ *B41J 2/471* (2013.01); *G02B 26/105* (2013.01); *B23K 26/082* (2015.10); *B29C 2945/76461* (2013.01); *B41M 5/0256* (2013.01)

(58) Field of Classification Search
CPC ...... B41J 2/471; G02B 26/105; B23K 26/082; B29C 2945/76461; B41M 5/0256
See application file for complete search history.

(56) References Cited

U.S. PATENT DOCUMENTS

| 6,677,695 B2 * | 1/2004 | Dhuler | H02N 1/006 |
| | | | 310/309 |
| 2003/0012488 A1 * | 1/2003 | Staple | B81B 3/0008 |
| | | | 385/18 |
| 2015/0116446 A1 * | 4/2015 | Toyota | B81B 3/0045 |
| | | | 347/256 |

FOREIGN PATENT DOCUMENTS

JP 2011-123176 6/2011

\* cited by examiner

*Primary Examiner* — Yaovi M Ameh
(74) *Attorney, Agent, or Firm* — Wenderoth, Lind & Ponack, L.L.P.

(57) ABSTRACT

In an optical scanning device including a vibration mirror part, elastically deformable resin portions are respectively provided at both end portions in a main scanning direction on a surface of the vibration mirror part, which is an opposite surface of a reflective surface, a collision member, which has a collision surface and can collide with each of the resin portion, is provided at a side opposite to a side of the reflective surface of the vibration mirror part, and a control unit allows the vibration mirror part to swing such that each of the resin portion collides with the collision surface at least once before light beam for image data writing is deflected and scanned by the vibration mirror part, and then allows the vibration mirror part to swing in a range in which each of the resin portion does not collide with the collision surface.

5 Claims, 9 Drawing Sheets

Main scanning direction

Fig.6

One side ←— Swing axis direction —→ Other side

OPTICAL SCANNING DEVICE AND IMAGE FORMING APPARATUS INCLUDING THE SAME

CROSS-REFERENCE TO RELATED APPLICATION

This application is based upon and claims the benefit of priority from Japanese Patent Application No. 2016-168598 filed on Aug. 30, 2016, the entire contents of which are incorporated herein by reference.

BACKGROUND

The technology of the present disclosure relates to an optical scanning device and an image forming apparatus including the same.

Conventionally, there has been known a resonance type optical deflector including a vibration mirror part and a torsion bar part that supports the vibration mirror part. In this optical deflector, when the vibration mirror part vibrates, airflow generated around the vibration mirror part may be separated from an end edge of the vibration mirror part and may allow the behavior (amplitude) of the vibration mirror part to be unstable. Such an unstable behavior of the vibration mirror part is called jitter and causes image quality degradation of a printed image.

There has been proposed an optical deflector having a configuration for suppressing the jitter of the vibration mirror part. In this optical deflector, a rectifying member is adhered to an opposite side surface of a reflective surface side of the vibration mirror part so as to rectify the flow of air. The rectifying member has a semicylindrical shape, so that separation of airflow generated around the vibration mirror part is suppressed.

SUMMARY

An optical scanning device according to one aspect of the present disclosure includes a light source, a vibration mirror part, a torsion bar part, a driving part, and a control unit. The light source emits light beam. The vibration mirror part has a reflective surface for reflecting the light beam from the light source. The torsion bar part supports the vibration mirror part. The driving part allows the vibration mirror part to resonate, thereby allowing the vibration mirror part to swing around the torsion bar part. The control unit controls the driving part.

Furthermore, elastically deformable resin portions are respectively provided at both end portions in a main scanning direction on a surface of the vibration mirror part, which is an opposite surface of the reflective surface. A collision member, which has a collision surface and is able to collide with each of the resin portion, is provided at a side opposite to a side of the reflective surface of the vibration mirror part. Furthermore, the control unit allows the vibration mirror part to swing such that each of the resin portion collides with the collision surface at least once before light beam for image data writing is deflected and scanned by the vibration mirror part, and then allows the vibration mirror part to swing in a range in which each of the resin portion does not collide with the collision surface, so that the light beam for image data writing is deflected and scanned by the vibration mirror part.

DETAILED DESCRIPTION

Hereinafter, an example of an embodiment will be described in detail on the basis of the drawings. It is noted that the technology of the present disclosure is not limited to the following embodiments.

Embodiment 1

Figure 1:
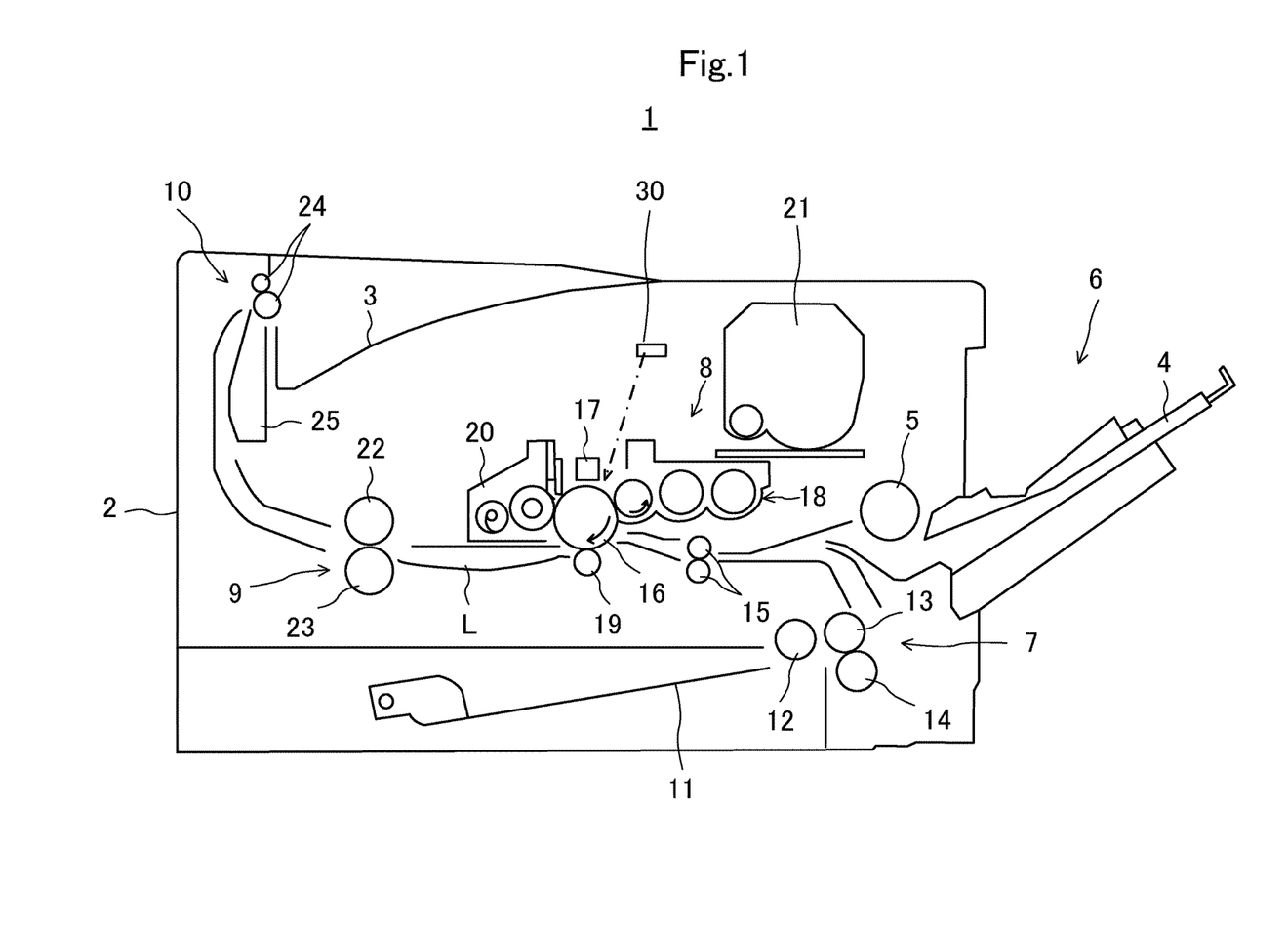
FIG. 1 is a schematic sectional view illustrating an image forming apparatus including an optical scanning device in an embodiment.

FIG. 1 is a sectional view illustrating a schematic configuration of a laser printer 1 as an image forming apparatus in an example of an embodiment.

As illustrated in FIG. 1, the laser printer 1 includes a box-like printer body 2, a manual sheet feeding unit 6, a cassette sheet feeding unit 7, an image forming unit 8, a fixing unit 9, and a sheet discharge unit 10. The laser printer 1 is configured to form an image on a sheet on the basis of image data transmitted from a terminal and the like (not illustrated) while conveying the sheet along a conveyance path L in the printer body 2.

The manual sheet feeding unit 6 has a manual tray 4 provided at one side portion of the printer body 2 so as to be openable and closable, and a manual sheet feeding roller 5 rotatably provided inside the printer body 2.

The cassette sheet feeding unit 7 is provided at a bottom portion of the printer body 2. The cassette sheet feeding unit includes a sheet feeding cassette 11 that accommodates a plurality of stacked sheets, a picking roller 12 that takes out the sheets in the sheet feeding cassette 11 one by one, and a feed roller 13 and a retard roller 14 that separate the taken-out sheets one by one and send the separated sheet to the conveyance path L.

The image forming unit 8 is provided above the cassette sheet feeding unit 7 in the printer body 2. The image forming unit 8 includes a photosensitive drum 16 serving as an image carrying member rotatably provided in the printer body 2, a charging device 17, a developing unit 18, a transfer roller 19, a cleaning unit 20, which are arranged around the photosensitive drum 16, an optical scanning device 30 arranged above the photosensitive drum 16, and a toner hopper 21. The image forming unit 8 is configured to form an image on a sheet supplied from the manual sheet feeding unit 6 or the cassette sheet feeding unit 7.

The conveyance path L is provided with a pair of resist rollers 15 that allow sent sheets to be temporarily waiting and then supply the sheets to the image forming unit 8 at a predetermined timing.

The fixing unit 9 is arranged at a lateral side of the image forming unit 8. The fixing unit 9 includes a fixing roller 22 and a pressure roller 23 brought into press-contact with each other and rotating together. The fixing unit 9 is configured to fix a toner image, which has been transferred to a sheet in the image forming unit 8, to the sheet.

The sheet discharge unit 10 is provided above the fixing unit 9. The sheet discharge unit 10 includes a sheet discharge tray 3, a sheet discharge roller pair 24 for conveying a sheet to the sheet discharge tray 3, and a plurality of conveyance guide rib parts 25 for guiding the sheet to the sheet discharge roller pair 24. The sheet discharge tray 3 is formed in a concave shape at an upper portion of the printer body 2.

When the laser printer 1 receives image data, the photosensitive drum 16 is rotationally driven and the charging device 17 electrifies the surface of the photosensitive drum 16 in the image forming unit 8. Next, on the basis of the image data, laser light (light beam) is emitted to the photosensitive drum 16 from the optical scanning device 30. The laser light is irradiated onto the surface of the photosensitive drum 16, so that an electrostatic latent image is formed. The electrostatic latent image formed on the photosensitive drum 16 is developed in the developing unit 18, so that the electrostatic latent image becomes a visible image as a toner image.

Then, the sheet passes through between the transfer roller 19 and the photosensitive drum 16. At this time, a transfer voltage acts between the transfer roller 19 and the photosensitive drum 16, so that the toner image of the photosensitive drum 16 is transferred to the sheet. The sheet with the transferred toner image is heated and pressed by the fixing roller 22 and the pressure roller 23 in the fixing unit 9. As a consequence, the toner image is fixed to the sheet.

Figure 2:
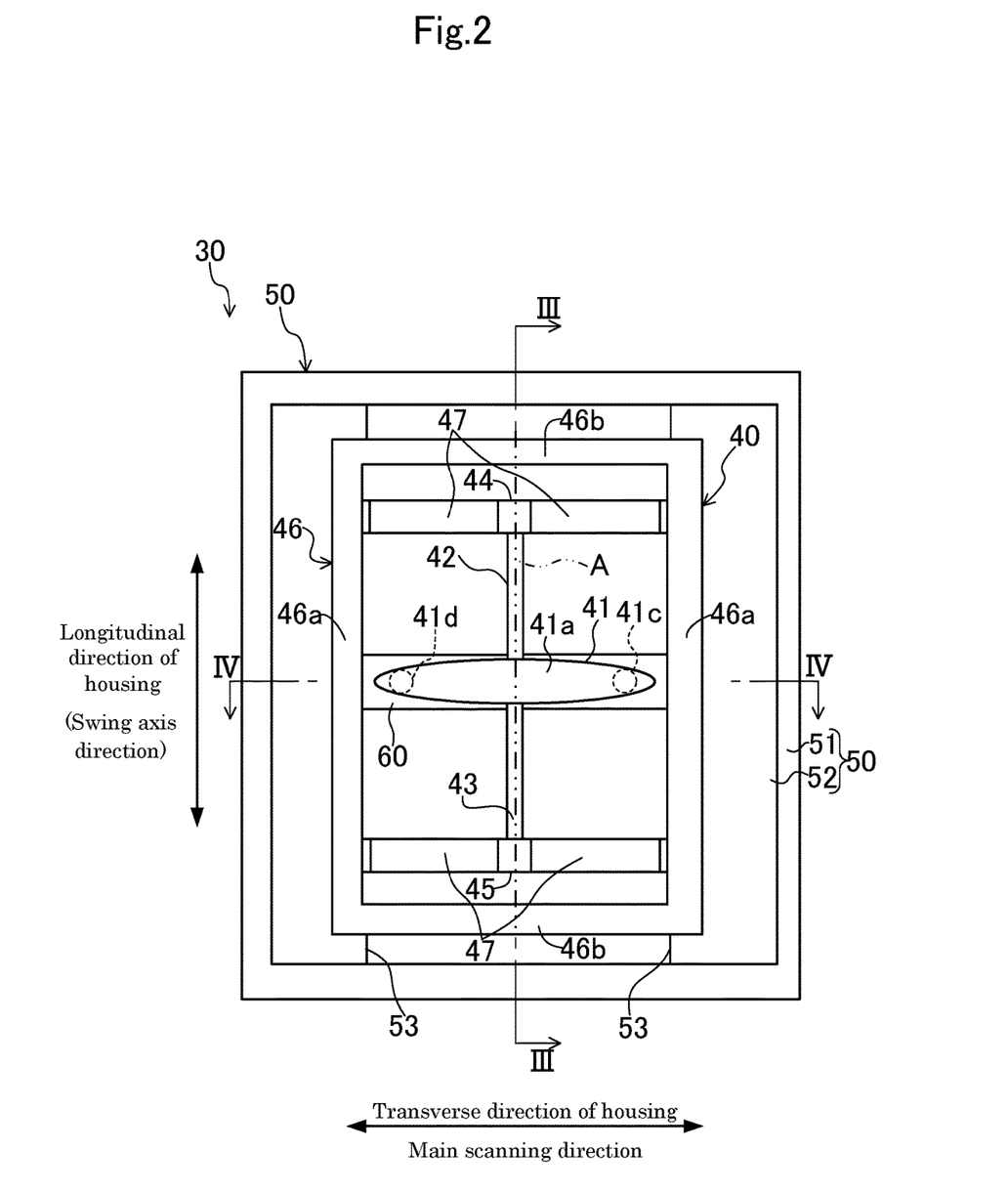
FIG. 2 is a plan view when viewed from a front side, which illustrates an optical scanning device in an embodiment.
Figure 3:
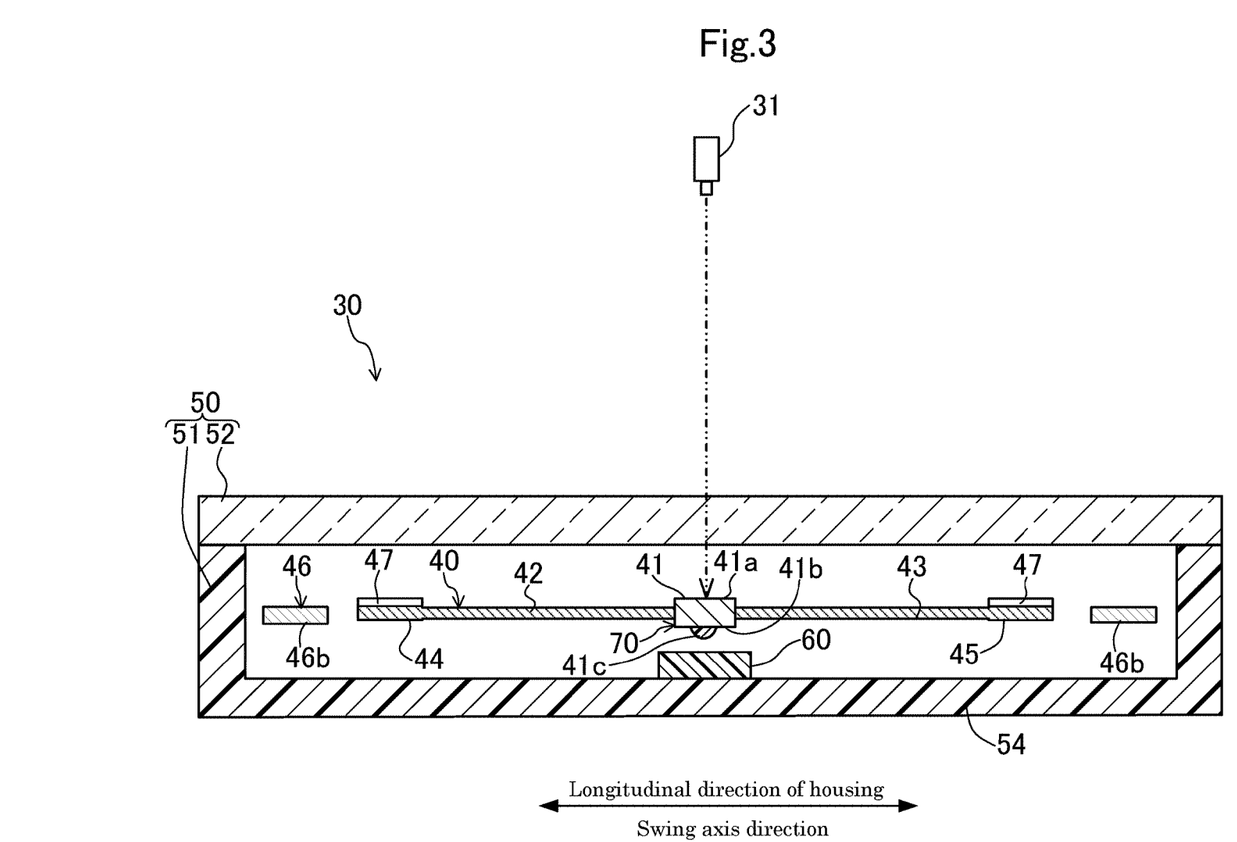
FIG. 3 is a sectional view taken along line III-III of FIG. 2.
Figure 4:
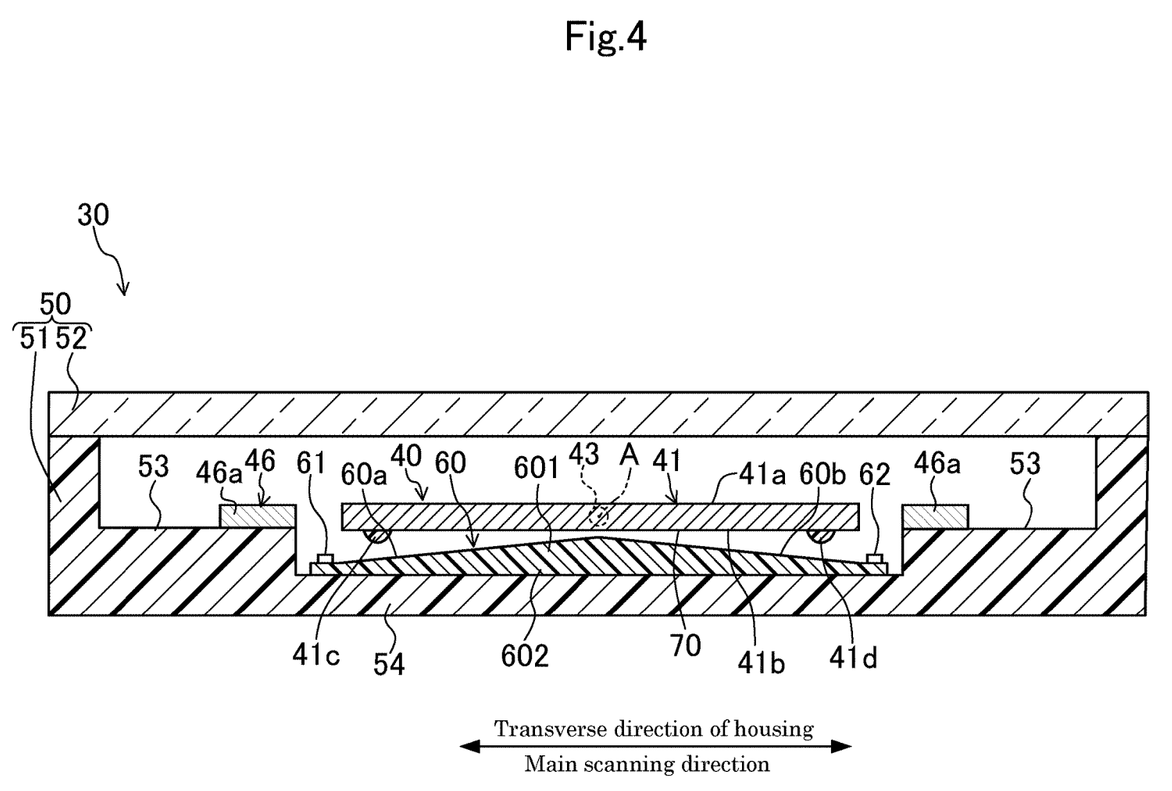
FIG. 4 is a sectional view taken along line IV-IV of FIG. 2.

As illustrated in FIG. 2 to FIG. 4, the optical scanning device 30 has a light source 31 (illustrated only in FIG. 4) for emitting light beam, an optical deflector 40, and a housing 50 for accommodating the optical deflector 40.

The housing 50 is formed in an approximately rectangular parallelepiped shape in an overall view. In a plan view, the housing 50 has a rectangular shape in which its length in a longitudinal direction (an up and down direction of FIG. 2) is larger than that in a transverse direction (a right and left direction of FIG. 2).

The housing 50 has a bottomed housing body 51 in which one side (a front side of a sheet surface of FIG. 2) in a height direction is opened, and a lid 52 that closes the opened side of the housing body 51. The housing body 51, for example, is made of a resin material, and the lid 52 is made of a member having light translucency, for example, a glass. The lid 52 is configured to allow light beam incident into a vibration mirror part 41, which will be described later, from the light source 31 and light beam reflected by the vibration mirror part 41 to be transmittable.

The optical deflector 40 is a so-called MEMS (Micro Electro Mechanical System) device, and is formed by etching a silicon plate.

Specifically, as illustrated in FIG. 2, the optical deflector 40 has the vibration mirror part 41, first and second torsion bar parts 42 and 43, first and second horizontal beam parts 44 and 45, and a fixed frame part 46 having an approximately rectangular plate shape.

The vibration mirror part 41 is formed in a thin plate shape having an approximately oval shape in the plan view.

The vibration mirror part 41 is arranged at an approximately center of the fixed frame part 46. A long diameter direction of the vibration mirror part 41 coincides with a transverse direction of the housing and a short diameter direction (a swing axis direction) of the vibration mirror part 41 coincides with a longitudinal direction of the housing. One side surface (a surface of the front side toward the paper surface of FIG. 2) of the vibration mirror part 41 in a thickness direction serves as a reflective surface 41a for reflecting the light beam emitted from the light source 31 (see FIG. 3). The reflective surface 41a is provided with a light reflective film made of, for example, aluminum or chrome in order to enhance reflectance of the light beam. In a reference state (in a state in which a torsion angle is 0°), the vibration mirror part 41 is arranged such that the reflective surface 41a is parallel to a lower wall portion 54 of the housing body 51. The vibration mirror part 41 torsionally vibrates around both torsion bar parts 42 and 43 from the reference state, thereby changing a reflective direction of the light beam incident into the reflective surface 41a from the light source 31 and thus reciprocally scanning the light beam in a main scanning direction (a direction coinciding with the transverse direction of the housing in the present embodiment).

The vibration mirror part 41 is provided on the surface (hereinafter, referred to as a rear surface of the vibration mirror part) 41b thereof, which is an opposite surface of the reflective surface 41a, with a pair of resin portions 41c and 41d. The pair of resin portions 41c and 41d are provided at both end portions of the rear surface 41b in the main scanning direction. Each of the resin portions 41c and 41d, for example, is formed in a hemispherical shape by solidifying a gelatinous adhesive. When viewed from a direction vertical to the reflective surface 41a of the vibration mirror part 41, each of the resin portions 41c and 41d is arranged so as to abut an outer edge of the vibration mirror part 41 and is arranged such that its center is positioned at a long axis of the vibration mirror part 41 (see FIG. 2). Each of the resin portions 41c and 41d can be elastically deformed by colliding with a collision member 60 to be described later.

The first and second torsion bar parts 42 and 43 have a plate shape long in the longitudinal direction of the housing. Both first and second torsion bar parts 42 and 43 are arranged on an extension line of a swing axis A of the vibration mirror part 41 in the plan view (on an extension line of a short axis). The first torsion bar part 42 has one end portion connected to the center part of the vibration mirror part 41 in the long diameter direction and the other end portion connected to the center part of the first horizontal beam part 44 in the longitudinal direction. The second torsion bar part 43 has one end portion connected to the center part of the vibration mirror part 41 in the long diameter direction and the other end portion connected to the center part of the second horizontal beam part 45 in the longitudinal direction. By so doing, both torsion bar parts 42 and 43 support the vibration mirror part 41 such that the vibration mirror part 41 can swing around the swing axis A.

The first and second horizontal beam parts 44 and 45 are arranged with an interval in the longitudinal direction of the housing. The vibration mirror part 41 is arranged between both horizontal beam parts 44 and 45. Both end portions of the first horizontal beam part 44 and both end portions of the second horizontal beam part 45 are connected to the fixed frame part 46. The fixed frame part 46 has a pair of longitudinal side portions 46a extending in the longitudinal direction of the housing and a pair of transverse side portions 46b extending in the transverse direction of the housing. The first and second horizontal beam parts 44 and 45 are respectively arranged across between both longitudinal side portions 46a of the fixed frame part 46. Each of the first horizontal beam part 44 and the second horizontal beam part 45 is mounted with two piezoelectric elements 47 (see FIG. 2 and FIG. 3) serving as driving parts. Each piezoelectric element 47 is electrically connected to a driving circuit 101 (see FIG. 8). Furthermore, an applied voltage applied to each piezoelectric element 47 is changed at a predetermined frequency by the driving circuit 101, so that each piezoelectric element 47 is extended and retracted for vibration. When the piezoelectric elements 47 vibrate at the same resonance frequency as that of the vibration mirror part 41, the vibration mirror part 41 resonates and torsionally vibrates around both torsion bar parts 42 and 43.

As illustrated in FIG. 4, the fixed frame part 46 is supported by a pair of pedestal parts 53 formed in the housing body 51. The pair of pedestal parts 53 include stepped portions formed at both end portions of the lower wall portion 54 of the housing body 51 in the transverse direction of the housing. The pair of pedestal parts 53 are formed over the entire housing body 51 in the longitudinal direction. The fixed frame part 46 is arranged across between the pair of pedestal parts 53.

Between the pair of pedestal parts 53 at the lower wall portion of the housing 50, the collision member 60 is provided. The collision member 60 is arranged at a position at which the collision member 60 can collide with the resin portions 41c and 41d provided on the rear surface 41b of the vibration mirror part 41. The collision member 60 is configured to be separated from the resin portions 41c and 41d when the vibration mirror part 41 is in the reference state (in the state in which the torsion angle is 0°), and to be able to collide with the resin portions 41c and 41d when the vibration mirror part 41 is twisted at a predetermined angle from the reference state.

The collision member 60 is a resinous member forming a separate body from the housing 50 and has a triangular part 601 and a rectangular plate part 602. The triangular part 601 is a columnar body having an isosceles triangular shape when viewed from the direction of the swing axis A of the vibration mirror part 41. The triangular part 601 is formed so as to overlap at least the whole of the vibration mirror part 41 (to include the whole of the vibration mirror part 41) in the plan view (see FIG. 2). That is, the length of the triangular part 601 in the main scanning direction is longer than the length of the vibration mirror part 41 in the main scanning direction, and the width of the triangular part 601 in the direction of the swing axis A is larger than the width in the direction of the swing axis A of the vibration mirror part 41. Preferably, the width of the triangular part 601 is 1.5 times or more as large as the width of the vibration mirror part 41 and is twice or less as large as the width of the vibration mirror part 41.

Figure 5:
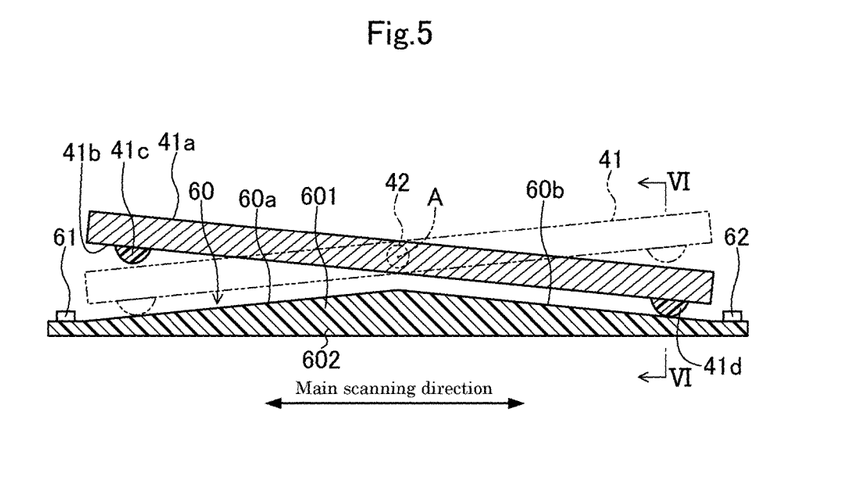
FIG. 5 is an enlarged view illustrating a vibration mirror part and a collision member in FIG. 4.

As illustrated in FIG. 5, a surface of the triangular part 601, which faces the vibration mirror part 41, includes a first inclination surface portion 60a and a second inclination surface portion 60b serving as collision surfaces. The first inclination surface portion 60a and the second inclination surface portion 60b are formed so as to reduce a distance to the vibration mirror part 41 as they are directed to the center side of the vibration mirror part 41 from both end sides thereof in the main scanning direction. A connection edge between the first inclination surface portion 60a and the second inclination surface portion 60b is positioned directly under the swing axis A of the vibration mirror part 41. The inclination angles of the first inclination surface portion 60a and the second inclination surface portion 60b with respect to the lower wall portion 54 are equal to each other and are 10° to 15° in the present embodiment. As indicated by a two dot chain line of FIG. 5, the inclination angles are set such that the vibration mirror part 41 and each of the inclination surface portions 60a and 60b are parallel to each other in a state in which the torsion angle of the vibration mirror part 41 is maximal. Furthermore, in the present embodiment, each of the inclination surface portions 60a and 60b is formed so as to be parallel to the direction of the swing axis A (see FIG. 6).

Figure 7:
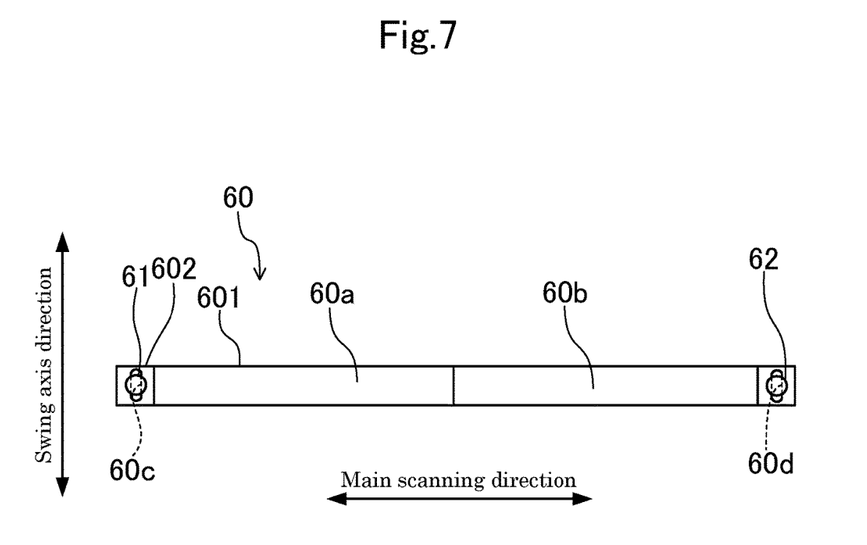
FIG. 7 is a plan view when a collision member is viewed from a height direction.

The rectangular plate part 602 is integrally formed with the triangular part 601 at a lower end of the triangular part 601. The widths of the rectangular plate part 602 and the triangular part 601 in the direction of the swing axis A are equal to each other. The length of the rectangular plate part 602 in the main scanning direction is longer than that of the triangular part 601 in the main scanning direction. The rectangular plate part 602 is formed at both end portions thereof in the main scanning direction with long holes 60c and 60d (see FIG. 7) extending in a direction perpendicular to the main scanning direction (the direction of the swing axis A). The lower wall portion 54 of the housing body 51 is formed with screw holes (not illustrated) threadably engaged with bolts 61 and 62 inserted through the long holes 60c and 60d. The collision member 60 is fixed to the lower wall portion 54 by the two bolts 61 and 62. As described above, the hole, through which each of the bolts 61 and 62 is inserted, is formed in a long hole shape, so that it is possible to easily adjust the position of the collision member 60 in the direction of the swing axis A.

Figure 8:
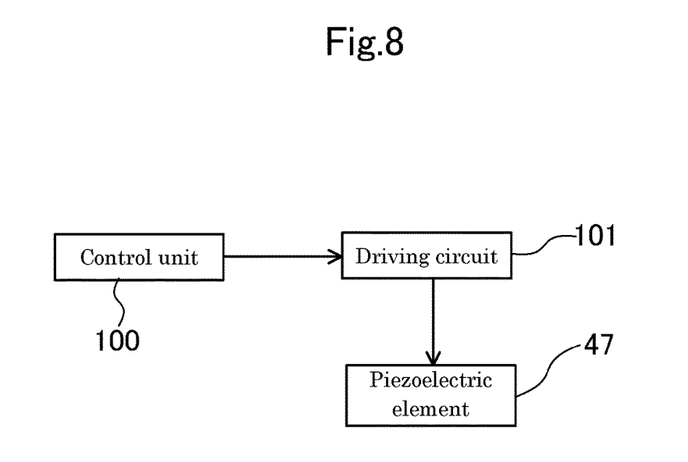
FIG. 8 is a block diagram illustrating a part of a control system of an optical scanning device.

As illustrated in FIG. 8, the piezoelectric element 47 is electrically connected to a control unit 100 via the driving circuit 101. The control unit 100 includes a microcomputer having a CPU, a ROM, and a RAM. The control unit 100 controls the operation of the piezoelectric element 47 via the driving circuit 101, thereby controlling the operation of the vibration mirror part 41.

The control unit 100 allows the vibration mirror part 41 to swing such that the resin portions 41c and 41d respectively collide with the first and second inclination surface portions 60a and 60b at least once (in this embodiment, once) before light beam for image data writing is deflected and scanned by the vibration mirror part 41 (for example, before execution of a print job is started from a stop state in which the laser printer 1 is powered off or before the execution of the print job is started from a standby state in which the laser printer 1 is powered on). Then, the control unit 100 allows the vibration mirror part 41 to swing in a range in which the resin portions 41c and 41d do not collide with the inclination surface portions 60a and 60b, respectively, so that the light beam for image data writing is deflected and scanned by the vibration mirror part 41.

When the resin portions 41c and 41d formed on the rear surface 41b of the vibration mirror part 41 respectively collide with the inclination surface portions 60a and 60b of the collision member 60 by driving control of the vibration mirror part 41 before the start of image data writing by the control unit 100, the resin portions 41c and 41d are elastically deformed, resulting in a change in air flow on the surfaces of the resin portions 41c and 41d. Specifically, after the resin portions 41c and 41d respectively collide with the inclination surface portions 60a and 60b, a bending amount (in other words, a change in the direction of airflow) of air having collided with the resin portions 41c and 41d is small and thus airflow smoothly flows along the surfaces of the resin portions 41c and 41d, as compared to before the collision. Therefore, air resistance acting on the vibration mirror part 41 is reduced, so that it is possible to reduce jitter of the vibration mirror part 41.

Embodiment 2

Figure 6:
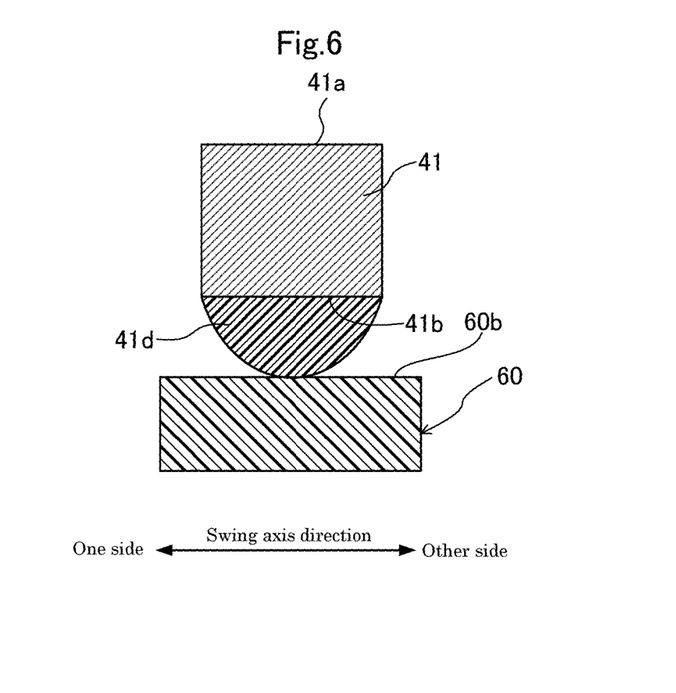
FIG. 6 is a sectional view taken along line VI of FIG. 5.
Figure 9:
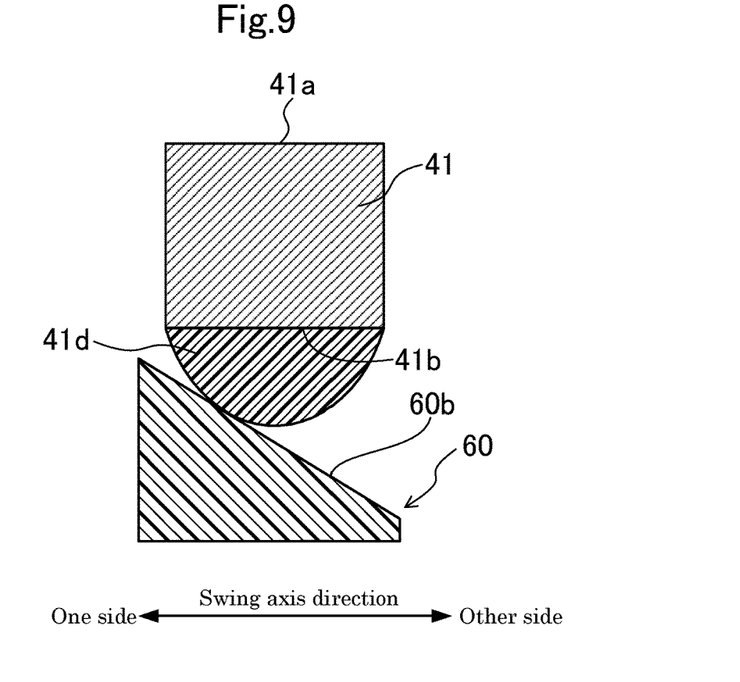
FIG. 9 is a view corresponding to FIG. 6, which illustrates an embodiment 2.

FIG. 9 is a view corresponding to FIG. 6, which illustrates an embodiment 2. In this embodiment, the shapes of the first and second inclination surface portions 60a and 60b of the collision member 60 are different from those of the aforementioned embodiment 1. It is noted that the other configurations, except for this point, are similar to those of embodiment 1.

In the present embodiment, the first and second inclination surface portions 60a and 60b (FIG. 9 illustrates only the second inclination surface portion 60b) are inclined with respect to the direction of the swing axis A of the vibration mirror part 41. Specifically, the first and second inclination surface portions 60a and 60b are inclined downward from one side toward the other side of the direction of the swing axis A of the vibration mirror part 41.

According to this configuration, the collision positions of the collision member 60 with the resin portions 41c and 41d can be deviated from the center positions of the resin portions 41c and 41d in the direction of the aforementioned swing axis A. Since the center positions of the resin portions 41c and 41d in the direction of the swing axis A serve as stagnation points of air, there is a small change in the direction of airflow due to the elastic deformation of the resin portions 41c and 41d. Consequently, in the case of deforming a part, other than the aforementioned stagnation points, on the surfaces of the resin portions 41c and 41d, an improvement effect of airflow, which is obtained by the elastic deformation of the resin portions 41c and 41d, is enhanced.

In the present embodiment, the collision positions of the collision member 60 with the resin portions 41c and 41d can be deviated to one side from the stagnation points (the center positions in the direction of the swing axis A) on the surfaces of the resin portions 41c and 41d, so that it is possible to reliably obtain an improvement effect of airflow when the resin portions 41c and 41d are elastically deformed. Thus, it is possible to more reliably obtain operations and effects similar to those of the aforementioned embodiment 1.

Furthermore, the position of the collision member 60 in the direction of the swing axis A is configured to be adjustable similarly to the embodiment 1. Consequently, the position of the collision member 60 in the direction of the swing axis A is adjusted, so that it is possible to easily adjust the collision positions of the collision member 60 with the resin portions 41c and 41d.

Embodiment 3

Figure 10:
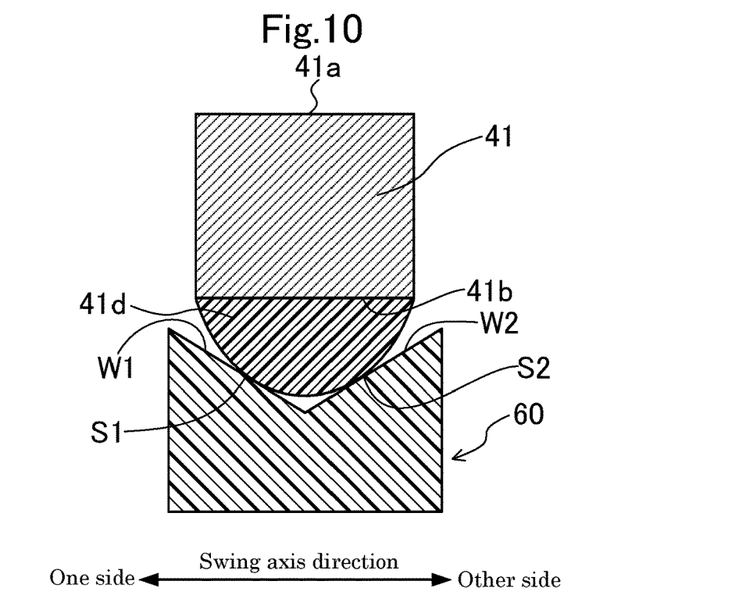
FIG. 10 is a view corresponding to FIG. 6, which illustrates an embodiment 3.

FIG. 10 is a view corresponding to FIG. 6, which illustrates an embodiment 3. In this embodiment, the shapes of the first and second inclination surface portions 60a and 60b of the collision member 60 are different from those of the aforementioned each embodiment. It is noted that the other configurations, except for this point, are similar to those of each embodiment.

In this embodiment, the first and second inclination surface portions 60a and 60b are formed with a groove having a pair of wall surfaces W1 and W2, wherein the wall surfaces W1 and W2 serve as collision surfaces. One wall surface W1 is inclined downward from one side toward the other side in the direction of the swing axis A of the vibration mirror part 41, and the other wall surface W2 is inclined upward from one side toward the other side in the direction of the swing axis A. That is, the pair of wall surfaces W1 and W2 are arranged in a V shape opened to the vibration mirror part 41 side when viewed from the main scanning direction. A connection edge between the pair of wall surface W1 and wall surface W2 is positioned directly under the center position in the direction of the swing axis A of the vibration mirror part 41.

According to this configuration, the collision positions of the collision member 60 with the resin portions 41c and 41d can be set at two places S1 and S2 deviated to one side and the other side of the stagnation points (the center positions in the direction of the aforementioned swing axis A) on the surfaces of the resin portions 41c and 41d. The collision places of the resin portions 41c and 41d with the collision member 60 are increased to the two places, so that the elastic deformation amount of the resin portions 41c and 41d due to the collision with the collision member 60 can be increased as compared with the embodiment 2. Thus, it is possible to more reliably obtain operations and effects similar to those of the aforementioned embodiment 2.

Example

Figure 11:
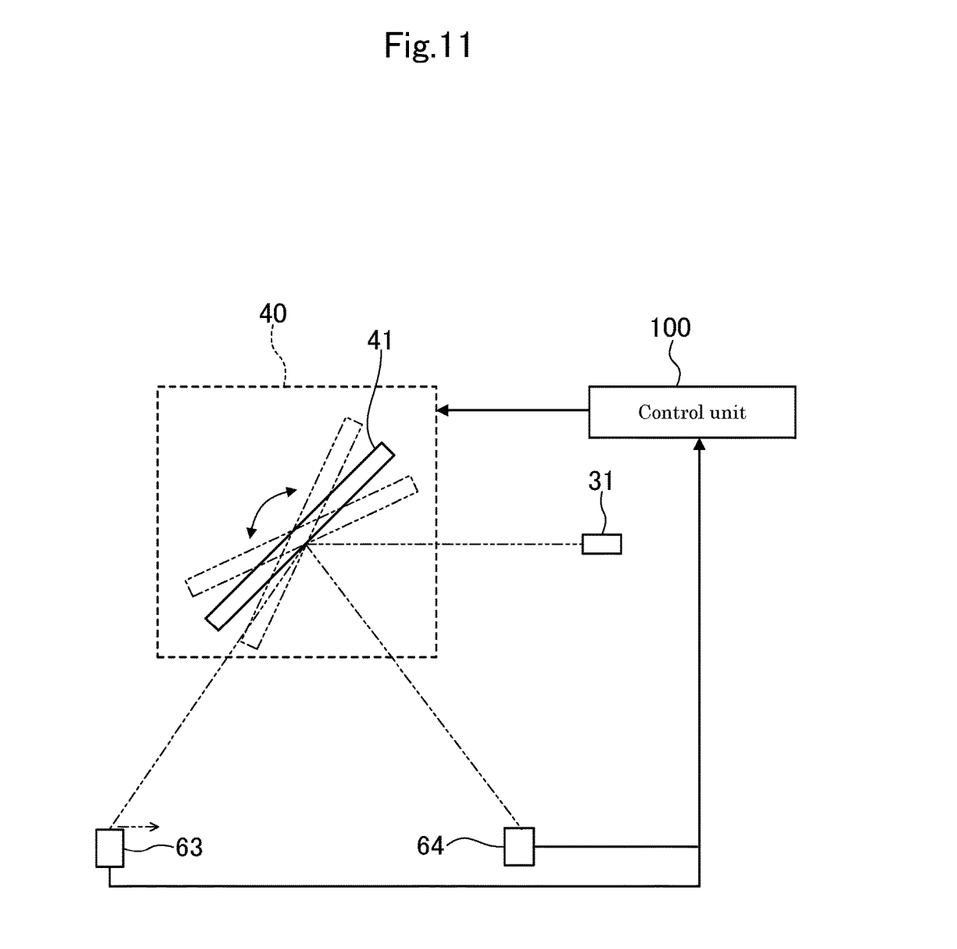
FIG. 11 is a schematic diagram illustrating a system configuration for measuring a jitter index.

A test for comparing the sizes of jitter with each other was performed using the optical deflectors 40 according to the aforementioned embodiments 1 to 3 and the related optical deflector 40. FIG. 11 is a configuration diagram of a system used in this test. In FIG. 11, a reference numeral 63 indicates a first light detection sensor provided at a scanning start position of light beam deflected and scanned by the vibration mirror part 41, and a reference numeral 64 indicates a second light detection sensor provided at a scanning end position of the light beam. Both light detection sensors, for example, are configured by a photodiode and output detection signals to the control unit 100 when detecting light. The control unit 100 calculates a jitter index G based on the detection signals from the light detection sensors 63 and 64.

The jitter index G is an index indicating the size of jitter (unstable vibration) and is calculated on the basis of the following equation. As the jitter index G is high, it means that the jitter is large.

$$G = \frac{\sum_{n=1}^{} (Tn - Tave)}{Tave} \quad \text{Equation 1}$$

In Equation 1 above, $T_n$ indicates a time until scanned light passes through the light detection sensor 64 after passing through the light detection sensor 63, and $T_{ave}$ indicates an average value of the time. The subscript n indicates the number of times (first, second, ..., $n^{th}$) of scanning of light beam.

In the present example, the light beam was scanned 2,000 times to measure $T_n$ for each scanning, so that the jitter index G was calculated on the basis of the aforementioned Equation 1 above.

Figure 12:
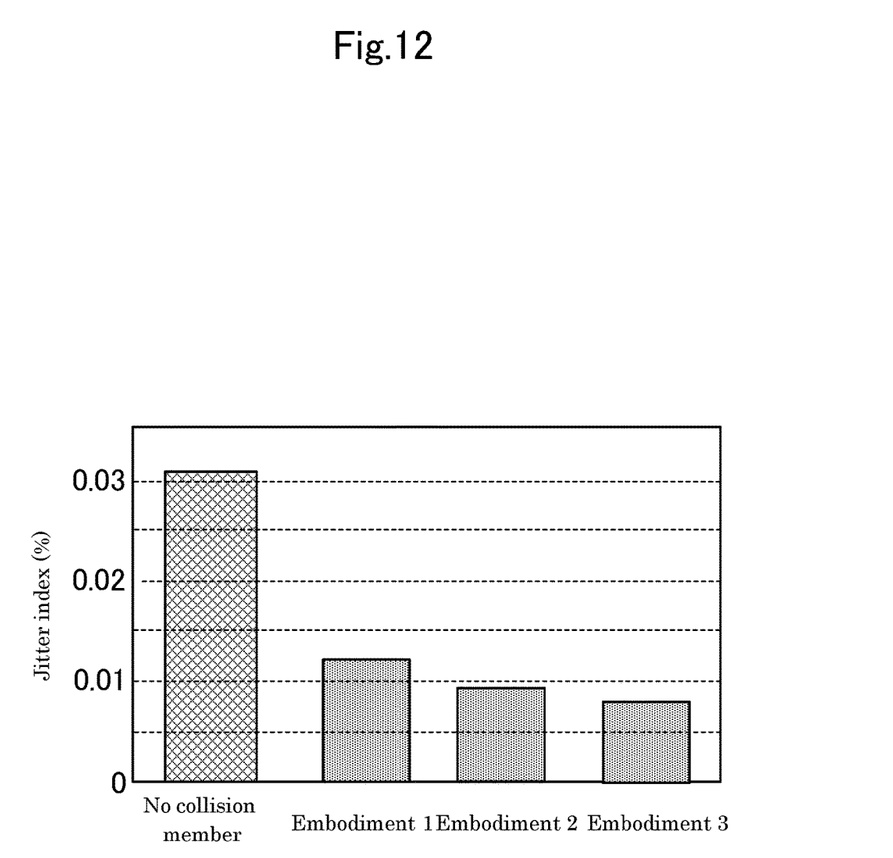
FIG. 12 is a graph illustrating a result obtained by measuring a jitter index.

FIG. 12 is a graph illustrating a result obtained by calculating the jitter index G with respect to the optical scanning device 30 of the embodiments 1 to 3 and the related optical scanning device 30 having no collision member 60. According to this graph, it can be understood that in the optical scanning device 30 of the embodiments 1 to 3, the jitter index G is reduced to about ⅓ or less as compared with the related optical scanning device 30 having no collision member 60. Furthermore, it can be understood that in the embodiment 2, the inclination surface portions 60a and 60b are allowed to be inclined in the direction of the swing axis A, so that the jitter index G is further reduced as compared with the embodiment 1. In addition, it can be understood that in the embodiment 3, the inclination surface portions 60a and 60b are formed with the groove having a V shape, so that the jitter index G is further reduced as compared with the embodiment 2.

OTHER EMBODIMENTS

Furthermore, in the aforementioned each embodiment, the example in which the optical deflector 40 is applied to the laser printer 1 has been described; however, the technology of the present disclosure is not limited thereto and for example, the optical deflector 40 may be applied to a copy machine, a multifunctional peripheral, a projector and the like.

What is claimed is:

1. An optical scanning device comprising:
   a light source that emits light beam;
   a vibration mirror part having a reflective surface for reflecting the light beam from the light source;
   a torsion bar part that supports the vibration mirror part;
   a driving part that allows the vibration mirror part to resonate, thereby allowing the vibration mirror part to swing around the torsion bar part; and
   a control unit that controls the driving part,
   wherein elastically deformable resin portions are respectively provided at both end portions in a main scanning direction on a surface of the vibration mirror part, which is an opposite surface of the reflective surface,
   a collision member, which has a collision surface and is able to collide with each of the resin portions, is provided at a side opposite to a side of the reflective surface of the vibration mirror part, and
   the control unit allows the vibration mirror part to swing such that each of the resin portions collides with the collision surface at least once before starting execution of a print job corresponding to image data by causing the light beam for the image data writing to be deflected and scanned by the vibration mirror part, and allows the vibration mirror part to swing in a range in which none of the resin portions collides with the collision surface, so that the light beam for the image data writing is deflected and scanned by the vibration mirror part, and thereby executes the print job corresponding to the image data.

2. The optical scanning device of claim 1, wherein the collision surface is inclined with respect to a direction of a swing axis of the vibration mirror part.

3. The optical scanning device of claim 1, wherein two collision surfaces are provided and are arranged to have a V shape which is opened to a side of the vibration mirror part when viewed from the main scanning direction.

4. The optical scanning device of claim 1, further comprising:
   an adjustment unit that is able to adjust a position of the collision member in a direction of a swing axis of the vibration mirror part.

5. An image forming apparatus including the optical scanning device of claim 1.

* * * * *